United States Patent [19]
Voelker

[11] 4,150,505
[45] Apr. 24, 1979

[54] BIRD TRAP AND CAT FEEDER

[76] Inventor: Leo O. Voelker, Linn, Kans. 66953

[21] Appl. No.: 822,683

[22] Filed: Aug. 8, 1977

[51] Int. Cl.² ..................... A01M 23/04; A01K 39/01
[52] U.S. Cl. ........................................... 43/69; 119/23
[58] Field of Search .................. 43/61, 66, 67, 68, 69; 119/23, 51 R

[56] References Cited
U.S. PATENT DOCUMENTS

| | | | |
|---|---|---|---|
| 652,615 | 6/1900 | Hays | 43/67 |
| 1,155,017 | 9/1915 | Tooley | 43/69 |
| 1,514,770 | 11/1924 | Kilchar | 43/69 |
| 1,753,082 | 4/1930 | Dickey | 43/66 |
| 3,778,922 | 12/1973 | Clark | 43/67 |

Primary Examiner—Nicholas P. Godici
Attorney, Agent, or Firm—Edwin H. Crabtree

[57] ABSTRACT

A bird trap and cat feeder for catching birds and feeding the birds to a cat. The trap designed to catch birds the size of a sparrow while releasing smaller song birds, wrens, swallows, or the like. The feeder providing means for continuously supplying a cat or neighborhood cats with sparrows to eat.

7 Claims, 5 Drawing Figures

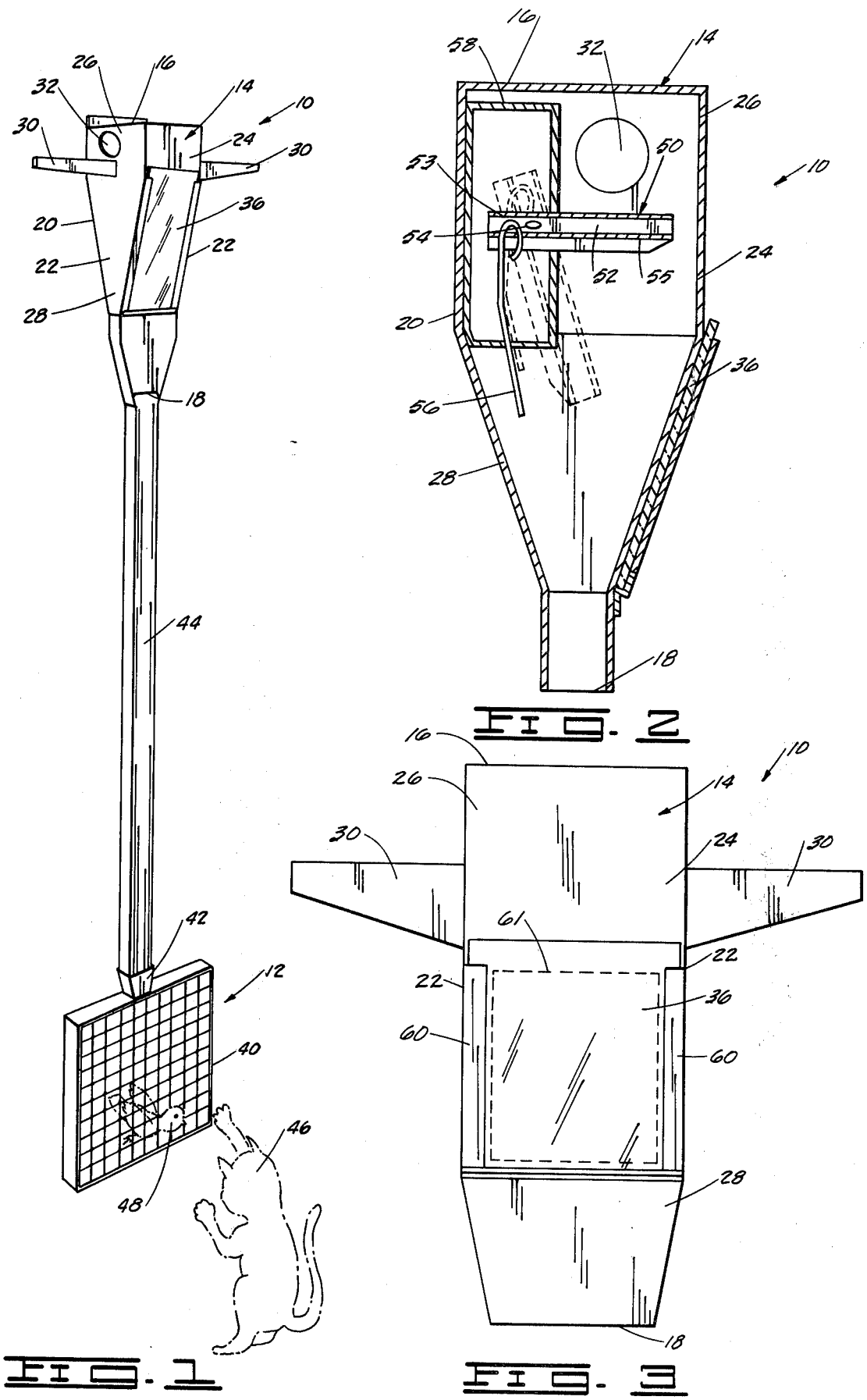

BIRD TRAP AND CAT FEEDER

BACKGROUND OF THE INVENTION

This invention relates generally to a bird trap and more particularly, but not by way of limitation to a bird trap for catching sparrows and feeding the sparrows to a cat.

Heretofore, there have been a variety of different types of bird traps, pigeon traps and the like for receiving birds in a bird housing and trapping the bird in different types of cages. None of the prior art traps disclose the novel features of catching a sparrow and including means for feeding the sparrow to a cat.

SUMMARY OF THE INVENTION

The subject invention solves the problem of reducing the population of sparrows.

Heretofore, the ordinary sparrow has greatly proliferated, thereby taking the place of more popular birds, such as the canary, blue bird, wren, swallow, and other birds that are appealing to the eye and enjoyable to listen to. Also, because of the increased population of the sparrow, the bird has become a nuisance due to bird droppings, the building of nests, and the taking of food supplies which would ordinarily be enjoyed by other birds.

The invention provides means for continuously trapping sparrows and supplying a cat and neighborhood cats with a supply of sparrows. The cat feeder by its design is self-cleaning since the cat quickly learns to remove the sparrow from the cage.

The trap provides a weighted balanced perch, which simulates a tree branch and lulls the bird into believing he can fly outwardly from an opening in a bird housing which is covered with a glass window.

The bird trap uses an elongated down spout which is attached to the bottom of the bird trap and the top of the cat feeder so that the bird trap may be placed at the top of a building structure while the cat feeder is placed near the ground level so that the cat may remove the bird therefrom.

The bird trap and cat feeder includes an enclosed bird housing having an upper portion, a tapered lower portion, a back, a front, a top, an open bottom, and sides. The housing includes entrance holes in the sides of the upper portion of the housing for receiving the bird therein. A balanced perch is pivotally mounted inside the housing and adjacent the entrance holes. A glass window is mounted in an opening in the tapered lower portion of the front of the housing. The cat feeder includes a one inch wire mesh cage which is communicably connected to the open bottom of the housing for receiving the bird therein.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective view of the bird trap and cat feeder.

FIG. 2 is a side sectional view of the bird trap.

FIG. 3 is a front view of the bird trap.

DETAILED DESCRIPTION OF THE DRAWINGS

Figure 4:
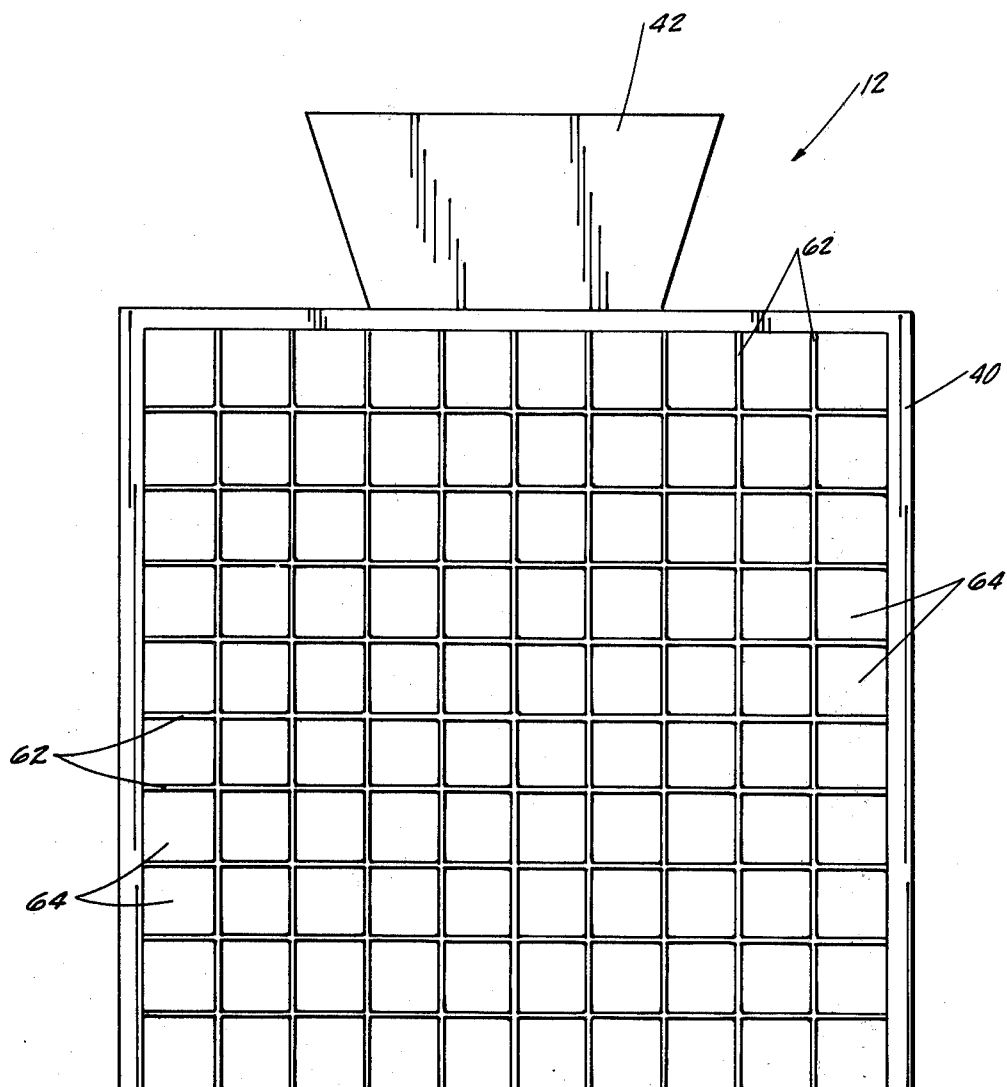
FIG. 4 is a front view of a wire mesh cage used as a cat feeder.

In FIG. 1, the bird trap is designated by general reference numeral 10, and the cat feeder is designated by general reference numeral 12. The bird trap 10 includes an enclosed housing 14 having a top 16, an open bottom 18, a back 20, sides 22, and a front 24. The housing 14 also includes an upper portion 26 and a tapered lower portion 28. Mounted on the outside of the sides 22 are stationary perches 30 which are disposed below a pair of entrance holes 32 for receiving a bird therethrough when it enters the housing 14. Mounted in front of an opening in the front 24 of the housing 14 and on the tapered lower portion 28 is a glass window 36. Only one entrance hole 32 can be seen in FIG. 1.

The cat feeder 12 includes a wire mesh cage 40 having a hollow funnel shaped connector 42 for receiving the lower end of a down spout 44. The upper end of the down spout 44 is connected to the open bottom 18 of the housing 14.

Through the use of the elongated down spout 44, the bird trap 10 may be mounted at the top of a building structure or the like, while positioning the cat feeder 12 near the ground level so that a cat 46 shown in dotted lines can reach the trapped sparrow 48 shown in dotted lines with his head sticking out of the cage 40.

In FIG. 2, a side sectional view of the bird trap 10 is seen. In this view, a balanced perch 50 is illustrated having a pivot tube 52 pivotally mounted on a pivot pin 54. A first end 53 of the pivot tube 52 has a balanced weight 56 suspended therefrom. A second end 55 of the pivot tube 52 is disposed below the entrance hole 32 for receiving the bird thereon when it enters the housing 14. The pivot pin 54 is attached to a pivot tube frame 58 which is secured to the back 20 of the housing 14. The balanced weight 56 provides sufficient weight to balance the pivot tube 52 in a horizontal position. When a bird enters the housing 14, and alights on top of the pivot tube 52, the pivot tube 52 becomes unbalanced and lowers the bird downwardly while the first end 53 of the tube 52 with the balanced weight 56 is raised upwardly until the end 53 contacts the side of the pivot frame 58, which acts as a stop. The tube 52 is also shown in dotted lines in a lowered position.

In FIG. 3, a front view of the bird trap 10 is illustrated. In this view, the glass window 36 can be seen slidably mounted in guides 60 adjacent an opening 61 shown in dotted lines in the front 24 of the housing 14.

In FIG. 4, an enlarged front view of the cat feeder 12 is illustrated. The cage 40 is made up of one inch wire mesh 62. Openings 64 in the wire mesh 62 are large enough to only allow the sparrow 48 to stick his head out the cage 40.

Figure 5:
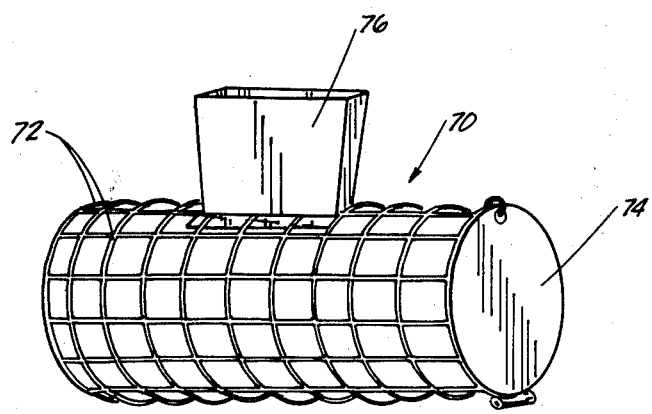
FIG. 5 is an alternate embodiment of a tubular shaped cage.

In FIG. 5, an alternate embodiment is shown wherein a tubular bird cage 70 is illustrated made of wire mesh 72 and having a hinged door 74 at one end for removing the birds by hand. The tubular cage 70 also includes a hollow funneled shaped connector 76 for attaching to the bottom of the down spout 44 or the open bottom 18 of the housing 14. The cage 70 may be used when it is desired to catch and remove birds by hand rather than using the cat feeder 12.

In operation, the bird trap 10, and cat feeder 12 provide means for effectively trapping a sparrow and feeding the sparrow to a cat. The bird lands on the stationary perch 30. The bird then enters the enclosed housing 14 through the entrance opening 32 wherein the bird alights on the balanced tube 52. At this time, the bird's weight combined with the weight of second end 55 of the balanced tube 52 overcomes the weight of the first end 53 of the balanced tube 52 and the balanced weight 56 thereby lowering the bird downwardly into the tapered lower portion 28 of the housing 14. The bird is lulled into believing that he is not in danger since the pivot tube 52 simulates the end of a tree branch. Also, as the bird is lowered on the pivot tube 52, the bird can see the opening 61 in the front 24 of the housing 14, which is covered by the glass window 36 although the bird is not aware of this. As the bird is lowered, the end 53 of the tube 52 comes to rest against the side of the pivot frame 58. At this point, the bird resting on the end 55 of the pivot tube 52 is adjacent the inside of the glass window 36. When the bird goes to fly out through the glass window 36, he leaves the pivot tube 52 which immediately is raised to its original horizontal position by the balanced weight 56. The bird is now trapped since the pivot tube 52 blocks his escape through the entrance openings 32. Therefore, his only means of leaving the housing 14 is through the open bottom portion 18. The bird then finds his way downwardly through the open bottom portion 18 through the down spout 44 and into the cat feeder 12. In the mean time, the cat or any other neighborhood cats who are aware of the cat feeder 12, are patiently waiting nearby. When the bird arrives in the cat feeder 12, he is anxious to escape and sticks his head through the 1" wire mesh 62 of the cage 40. The bird is not able to get the rest of his body through the mesh 62, but is aided by the cat who quickly pulls the bird out of the cage 40 with his paw, and is rewarded with a fresh bird dinner. The subject bird trap successfully traps sparrows to the delight of the owner of the invention and to the enjoyment of cats who dine on birds.

Changes may be made in the construction and arrangement of the parts or elements of the embodiment as disclosed herein without departing from the spirit or scope of the invention as defined in the following claims.

I claim:

1. A bird trap and cat feeder for catching a bird and in particular, a sparrow, and feeding the bird to a cat, the trap comprising:
   an enclosed bird housing having an upper portion, a tapered lower portion, a back, a front, a top, an open bottom, and sides;
   an entrance hole mounted in the side of the upper portion of said housing for receiving the bird therethrough;
   a glass window mounted in an opening in the tapered lower portion of the front of said housing;
   a balanced pivot tube pivotally mounted on a pivot pin inside said housing, a first end of said pivot tube is attached to a balance weight for balancing said tube in a horizontal position, a second end of said tube is disposed adjacent and below said entrance hole for receiving the bird thereon, the second end of said pivot tube with the bird thereon lowered downwardly, when the second end of said pivot tube is lowered downwardly the second end is disposed in the tapered lower portion of said housing and adjacent said glass window; and
   a wire mesh cage communicably connected to the open bottom of said housing for receiving the bird therein, said wire mesh cage dimensions so that the openings in the wire mesh are small enough to prevent the bird from escaping, the openings in the wire mesh are large enough for the bird to stick his head through the openings in the wire mesh so that the cat can quickly pull the bird out of said cage with his paw.

2. The trap as described in claim 1, further including a pair of entrance holes in both sides of the upper portion of said housing.

3. The trap as described in claim 1, further including an outside perch attached to the side of said housing and below said entrance hole.

4. The trap as described in claim 1, further including a hollow elongated down spout disposed between said cage and the open bottom of said housing and communicably connected at one end to said cage and the other end to said open bottom of said housing.

5. The trap as described in claim 1, wherein said cage includes a one inch wire mesh cage having a funneled connector attached to the top of the cage for communicably connecting said cage to the open bottom of said housing.

6. The trap as described in claim 1, wherein said cage includes a wire mesh tubular cage having a funneled connector mounted in the top thereof for communicably connecting said cage to the open bottom of said housing, said tubular wire mesh cage having a hinged door mounted at one end thereof for removing the birds when received therein.

7. A bird trap and cat feeder for catching a bird and in particular, a sparrow, and feeding the bird to a cat, the trap comprising:
   an enclosed bird housing having an upper portion, a tapered lower portion, a back, a front, a top, an open bottom, and sides;
   a pair of entrance holes in both sides of the upper portion of said housing;
   a pair of outside perches attached to the sides of said housing and below said entrance holes;
   a glass window mounted in an opening in the tapered lower portion of the front of said housing;
   a balanced pivot tube pivotally mounted on a pivot pin inside said housing, a first end of said pivot tube is attached to a balance weight for balancing said tube in a horizontal position, a second end of said pivot tube is disposed adjacent and below said entrance holes for receiving the bird thereon, the second end of said pivot tube with the bird thereon lowered downwardly, when the second end of said pivot tube is lowered downwardly the second end is disposed in the tapered lower portion of said housing and adjacent said glass window;
   a hollow elongated downspout having one end communicably connected to the open bottom of said housing; and
   a wire mesh cage communicably connected to the other end of said hollow elongated downspout, said wire mesh cage dimensions so that the openings in the wire mesh are small enough to prevent the bird from escaping, the openings in the wire mesh are large enough for the bird to stick his head through the openings in the wire mesh so that the cat can quickly pull the bird out of said cage with his paw.

* * * * *